United States Patent [19]

Horton

[11] Patent Number: 4,843,102

[45] Date of Patent: Jun. 27, 1989

[54] REMOVAL OF MERCURY FROM GASES

[75] Inventor: Robert L. Horton, South Russel, Ohio

[73] Assignee: Phillips Petroleum Company, Bartlesville, Okla.

[21] Appl. No.: 777,114

[22] Filed: Sep. 18, 1985

Related U.S. Application Data

[62] Division of Ser. No. 662,737, Oct. 19, 1984, Pat. No. 4,591,490.

[51] Int. Cl.[4] .............................................. C08D 5/20
[52] U.S. Cl. ...................................... 521/28; 521/26
[58] Field of Search ......................................... 521/28

[56] References Cited

U.S. PATENT DOCUMENTS

| | | | |
|---|---|---|---|
| 3,085,859 | 4/1963 | Scholten | 23/134 |
| 3,183,185 | 5/1985 | Haagen | 521/33 |
| 3,617,563 | 11/1971 | Fuxellus | 210/38 |
| 3,661,509 | 5/1972 | Ferrara et al. | 23/2 S |
| 3,790,535 | 2/1974 | Motani et al. | 521/33 |
| 4,044,098 | 8/1977 | Miller et al. | 423/210 |
| 4,147,626 | 4/1979 | Findlay et al. | 210/914 |
| 4,474,896 | 10/1984 | Chao | 502/216 |

FOREIGN PATENT DOCUMENTS 32584 9/1982 Bulgaria .

OTHER PUBLICATIONS

Arthur H. Thomas Company Catalogue, p. 824.

*Primary Examiner*—Joseph L. Schofer
*Assistant Examiner*—Peter F. Kulkosky
*Attorney, Agent, or Firm*—A. W. Umphlett

[57] ABSTRACT

Mercury is removed from a gas stream using anion exchange resins.

2 Claims, No Drawings

REMOVAL OF MERCURY FROM GASES

This application is a Divisional application of application Ser. No. 662,737, now U.S. Pat. No. 4,591,490.

This invention relates to a process for removing mercury from gases. In particular it relates to a method of removing mercury from natural gas. It also relates to a composition that is useful in removing mercury from gases. It further relates to the regeneration of a composition useful in the removal of mercury from gases.

In recent years it has been discovered that many sulfur-free natural gas deposits contain small amounts of mercury, usually in the range of about 1 part per million or less. The presence of even this small amount of mercury poses a potential health hazard under some circumstances. There is also the ever present potential safety hazard in using this gas in cryogenic processing plants where mercury can amalgamate with aluminum in processing equipment, eventually weakening the metal and leading to leakage or a rupture.

Anion exchange resins have been shown in the past useful for recovering mercury salts from brine solution. The advantage of using an anionic exchange resin is that it can be regenerated by washing it with hydrochloric acid or nitric acid to remove the anion exchanged mercury salts.

It is therefore an object of this invention to provide a process for treating gas streams to lower the mercury content of the gas. Another object of this invention is to provide an economical means for removing mercury from gases. Another object of this invention is to provide a regeneratable means useful in removing mercury from gases. Other objects and advantages will become apparent from the following description of the invention.

SUMMARY OF THE INVENTION

In accordance with the instant invention in aqueous polysulfide solution is reacted with a strongly basic anion exchange resin to produce an adsorbent useful in removing mercury from gases at low concentration levels. In a specific embodiment of this invention, one molar sodium (pseudo-) tetrasulfide solution is reacted with a strongly basic anion exchange resin.

DETAILED DESCRIPTION OF THE INVENTION

The instant invention is particularly useful in removing mercury from a natural gas stream. The process entails contacting the mercury-containing natural gas stream with the polysulfide-resin complex. The polysulfide-resin complex can then be regenerated by washing the mercury-containing complex with polysulfide solution.

The polysulfide-resin complex is made by heating a solution of sodium sulfide mixed with elemental sulfur in a stoichiometry which would produce sodium tetrasulfide. This solution in general range from about 0.05 molar solution to one of a higher concentration with a limit being the viscosity of the solution. About 0.5 to about 2 molar solutions are preferred. The solution so produced is probably a mixture of sodium tetrasulfide and various sodium polysulfides, hence the term "(pseudo-) tetrasulfide" is used rather than "tetrasulfide". This solution is then contacted with the ion exchange resin.

Ion exchange resins useful in this invention can be any basic anion exchange resin. Typical anion exchange resins useful in the invention are those which have an HCl uptake capacity of 2.3–2.5 milliequivalents per gram. An example of such a resin includes cross-linked copolymers of styrene and benzene onto which quarternary ammonium groups have been incorporated. Preferable anion exchange resins include such as Dowex ® 1,2 or 21K and Rohm and Haas IRA-430, 410 or 400.

The amount of polysulfide solution used is determined by the ion exchange resin used. Generally, the amount of polysulfide solution used is that amount which is sufficient to saturate the ion exchange resin with the polysulfide solution. The sulfur content on the resin should be in the range of about 0.1% to about 30% by weight based on the weight of the resin. Preferably, the amount of sulfur will range from about 1 to about 25%. Most preferably it will range from about 2 to about 8%.

The polysulfide-resin complex thus formed can be further treated by washing the complex with water or other suitable fluid and then dried. The drying can be accomplished in any manner, (e.g. by a stream of warm air or nitrogen).

The polysulfide-resin complex can be used in any form, for instance, pellets, beads or coarsely ground granules.

Any elemental sulfur present in the resin complex is dissolved as polysulfide. If excess elemental sulfur is present the resin can be treated with a hot sodium sulfide solution which can be followed with a repeat treatment of the tetrasulfide solution to effect regeneration. This treatment brings any mercury or mercury sulfides into solution as polysulfide complex ions of the formula $Hg(S_x)(S_y)^{2-}$, where x and y usually are 1 to about 3 but can be much larger. The treated resin can then be used as is or air oxidized before use.

After the resin polysulfide composite capacity has been exhausted the resin complex is then regenerated. One particularly useful property of this complex is that it can be regenerated once it is partially or completely exhausted of mercury removal capacity. This is accomplished by contacting the complex with a polysulfide solution similar to that disclosed earlier and heating the complex in the presence of one molar solution. The heat treatment can range anywhere from 100° to 220° F., but preferably the temperature will be between 150° and about 210° F.

One way to tell when the resin needs to be regenerated is by the color of the resin. The resin changes color to dark gray when loaded. Another way to tell is to run the gas stream until there is a "breakthrough" (sharp increase in mercury content of the effluent), possibly running with a back-up bed in series. Yet another method is to calculate the loading based on feed and effluent compositions and flowrates, and arbitrarily regenerating after a certain loading (e.g., 2–5 weight percent). Since in most applications, regenerations will be infrequent (a matter of weeks), the latter method is favored.

A second method for regenerating the complex involves contacting it with dilute nitric acid solution. The procedure is to contact the mercury-loaded adsorbent with a dilute nitric acid solution, ranging from 5–40 weight percent, but preferably 10–25 weight percent, at room temperature to about 200° F., or preferably 100°–150° F., for ¼–4 hours, preferably ½–3 hours, after which adsorbent is washed with water and dried, (e.g., in a stream of warm air or nitrogen). Optionally, the acid regenerated adsorbent may be further treated with polysulfide solution.

The treating process is simple to intimately contact the mercury-containing gas with the polysulfide impregnated basic ion exchange resin. This contacting is readily accomplished by passing the gas through a bed of the resin which can be in the form of granules, beads or pellets, −16−+40 mesh being an acceptable size, but any convenient size would be satisfactory, consistent with pressure drop considerations.

This invention has no temperature limitations, except that the temperature used should be a reasonable one. The process can be carried out at ambient temperature and any pressure consistent with other process or use considerations. A temperature range of 50°–200° F. should be satisfactory. A space velocity of 10–200 v/v/hr (volume gas per volume resin per hour) is preferred, with 5–500 v/v/hr being operable.

The mercury content of the gas stream can range from below 0.25 ng/std. liter to pure mercury vapor. The concentration of the latter, of course, depends on temperature; therefore it should be more precisely stated as pure mercury vapor at the temperature of use of the resin. While the instant invention was created to address mercury removal from natural gas (hence very low concentration), the invention has nevertheless proven useful over a very broad mercury concentration range. Accordingly there is no mercury content limit to be applied as the preferred range of application of the invention.

EXAMPLE I 240.18 g $Na_2S \cdot 9H_2O$ and 96.2 g powdered sulfur were mixed with 1 kg water and heated at near the boiling point until all the sulfur dissolved (reacted) to yield sodium polysulfide (stoichiometrically $Na_2S_4$; 1 molar solution) which was then allowed to cool. 80 g Amberlite 430 (−16−+40 mesh), a strong base (anion exchange) ion exchange resin sold by Rohm & Haas, was contacted with 100 mL of the polysulfide solution. The resin turned from its natural yellow color to dark red. Excess solution was decanted off, the resin thoroughly washed with distilled water and allowed to dry overnight in open air at ambient temperature (75° F.). At this point most of the red color had disappeared, leaving the resin with a sulfur-yellow color.

40 g of the treated resin, which contained 8.53 wt % sulfur, was placed in a desiccator charged with metallic mercury (rather than dessicant) to contact mercury vapor. During this period the resin slowly turned from sulfur-yellow to yellow-gray to dark gray over a period of 20 days. The resin was found to contain 16.9 μg Hg/g resin compared with <3 ng/g before charging to the desiccator. This dark gray resin was then prepared 1M sodium polysulfide solution at about 85° C. (185° F.). The Hg content of the dried resin after the treatment was only 9.32 μg/g, indicating about 45% of the mercury had been displaced, but the sulfur content was increased to 27.04 wt %. This partially regenerated resin was recharged to the desiccator containing mercury and left for another 20 days. The resin was then found to contain 6.81 wt % mercury, a remarkable increase in loading. This mercury-loaded resin was again contacted with the 1M polysulfide solution at 85° C., rinsed and dried. This treatment reduced the mercury content to 2.81 wt %, indicating about 58% of the mercury had been removed. This regenerated resin, which now had a sulfur content of 26.24 wt %, was again charged to the desiccator for 20 days at which time it analyzed 7.54 wt % Hg. This loaded resin was regenerated by contacting with warm 20 wt % nitric acid for nearly 2 hours, filtered, washed and dried. This treatment reduced mercury content to 3.21 wt % (about 57% mercury removal) and reduced sulfur content to 10.21 wt %. The resin was regenerated as before with 1M polysulfide solution which restored the sulfur content to 22.71 wt %; mercury content was 3.16 %.

EXAMPLE II 1000 g sodium polysulfide prepared as in Example 1 was contacted with 800 g Amberlite 430 (−16−+40 mesh), filtered and washed with distilled water and dried in a vacuum desiccator overnight. 80.00 g samples of the treated resin were placed in closed desiccators containing liquid mercury (rather than desiccant) and thus exposed to mercury vapor for various periods of time to load the sample with adsorbed mercury. These samples were analyzed for sulfur and mercury content (see table) then 70 g of each was charged to an adsorbent tube and nitrogen gas containing 4.90 ngHg/std liter was passed through the tubes at 500 psig and room temperature. The nitrogen flow rate through the adsorbent tube was 2 liters (standard conditions) per minute. After a short time on stream the effluent gas was analyzed using a Coleman Mercury Analyzer, an atomic absorption type analyzer which is available from many laboratory supply houses (e.g., Perkin Elmer, A.H. Thomas). Effluent gas analyses are also given in the table, column 5.

| Sample No. | Days Exposed To Hg. Vapor | S content of Resin, Wt. % | Hg Content of Resin, μg/g | Hg Content of Effluent Gas, ng/l |
|---|---|---|---|---|
| 1 | 0 | 7.64 | 0 | <0.25 |
| 2 | 10 | 7.58 | 5.1 μg/g | <0.25 |
| 3 | 21 | 7.73 | 25 μg/g | <0.25 |
| 4 | 29 | 7.54 | 370 μg/g | <0.25 |
| 5 | 41 | 7.50 | 0.65% | <0.25 |
| 6 | 65 | 7.34 | 2.17% | <0.25 |
| 7 | 80 | 7.26 | 4.99% | ~0.50 |

These results indicate the adsorbent was capable of adsorbing mercury down to the limits of detection, 0.25 ng/l while retaining 2.17 wt % Hg and was adsorbing about 90% of the low concentration mercury even when the adsorbent contained 4.99 wt % Hg.

I claim:

1. A method for treating a polysulfide-resin complex comprising: (1) producing a polysulfide-resin complex by the method comprising (1) contacting basic insoluble anion exchange resin with a source of polysulfide anions under ion exchange conditions to produce a polysulfide-resin complex, (b) washing said polysulfide-resin complex with distilled water to produce a washed product and (c) drying said washed product at ambient temperature to produce a dried product; (2) contacting said dried polysulfide-resin complex with mercury vapor for a time sufficient to provide a mercury-containing polysulfide-resin complex; and (3) contacting said mercury containing polysulfide-resin complex with a source of polysulfide anions under ion exchange conditions for a time sufficient at least partially to displace the contained mercury thereby producing an at least partially regenerated polysulfide-resin complex.

2. A method for treating a polysulfide-resin complex comprising: (1) producing a polysulfide-resin complex by the method comprising (a) contacting basic insoluble anion exchange resin with a source of polysulfide anions under ion exchange conditions to produce a polysulfide-resin complex, (b) washing said polysulfide-resin complex with distilled water to produce a washed product and (c) drying said washed product at ambient temperature to produce a dried product; (2) contacting said dried polysulfide-resin complex with mercury vapor for a time sufficient to provide a mercury containing polysulfide-resin complex, (3) contacting said mercury-containing polysulfide-resin complex with nitric acid solution for a time sufficient to provide polysulfide-resin complex from which contained mercury has been at least partially removed, (4) removing said nitric acid solution from said polysulfide-resin complex from which mercury has been at least partially removed and (5) contacting the product of step (4) with a source of polysulfide anions under ion exchange conditions for a time sufficient to provide an at least partially regenerated polysulfide-resin complex.

* * * * *

UNITED STATES PATENT AND TRADEMARK OFFICE
CERTIFICATE OF CORRECTION

PATENT NO. : 4,843,102

DATED : June 27, 1989

INVENTOR(S) : Robert L. Horton

It is certified that error appears in the above-identified patent and that said Letters Patent is hereby corrected as shown below:

Claim 1, column 4, line 52 "(1)" should be "(a)"

Signed and Sealed this

Twenty-fifth Day of December, 1990

Attest:

HARRY F. MANBECK, JR.

*Attesting Officer*  *Commissioner of Patents and Trademarks*